(12) United States Patent
Piot et al.

(10) Patent No.: US 9,092,091 B2
(45) Date of Patent: Jul. 28, 2015

(54) OPTICAL TOUCH TOMOGRAPHY

(71) Applicant: Rapt IP Limited, Gibraltar (GI)

(72) Inventors: Julien Piot, Rolle (CH); Mihailo Kolundzija, Lausanne (CH); Danil Korchagin, San Mateo, CA (US); Ivan Dokmanic, Lausanne (CH); Martin Vetterli, Grandeur VD (CH); Owen Drumm, Dublin (IE)

(73) Assignee: Rapt IP Limited, Gibraltar (GI)

(*) Notice: Subject to any disclaimer, the term of this patent is extended or adjusted under 35 U.S.C. 154(b) by 12 days.

(21) Appl. No.: 14/092,850

(22) Filed: Nov. 27, 2013

(65) Prior Publication Data

US 2014/0152624 A1    Jun. 5, 2014

Related U.S. Application Data

(60) Provisional application No. 61/732,225, filed on Nov. 30, 2012.

(51) Int. Cl.
*G06F 3/042* (2006.01)
*G06F 3/041* (2006.01)

(52) U.S. Cl.
CPC .............. *G06F 3/042* (2013.01); *G06F 3/0416* (2013.01); *G06F 3/0421* (2013.01)

(58) Field of Classification Search
CPC ........................................ G06F 3/042–3/0428
See application file for complete search history.

(56) References Cited

U.S. PATENT DOCUMENTS

| 7,995,039 B2 * | 8/2011 | Eliasson et al. ............... 345/173 |
| 8,581,884 B2 * | 11/2013 | Fahraeus et al. ............. 345/176 |
| 8,686,974 B2 * | 4/2014 | Christiansson et al. ...... 345/175 |
| 2009/0153519 A1 * | 6/2009 | Suarez Rovere ............. 345/173 |
| 2011/0163996 A1 * | 7/2011 | Wassvik et al. ............... 345/175 |
| 2011/0227874 A1 * | 9/2011 | Fahraeus et al. ............. 345/175 |
| 2012/0212457 A1 * | 8/2012 | Drumm ......................... 345/175 |
| 2013/0135259 A1 * | 5/2013 | King et al. .................... 345/175 |
| 2014/0085241 A1 * | 3/2014 | Christiansson et al. ...... 345/173 |

FOREIGN PATENT DOCUMENTS

| WO | WO 2010/064983 A2 | 6/2010 |
| WO | WO 2013/095271 A2 | 6/2013 |

OTHER PUBLICATIONS

PCT International Search Report and Written Opinion, PCT Application No. PCT/IB2013/003172, Aug. 11, 2014, 10 pages.
Bayati, M. et al., "Iterative Methods in Statistical Estimation," Information Theory Workshop, Stanford University, Sep. 6, 2012, 120 pages.

(Continued)

*Primary Examiner* — Patrick F Marinelli
(74) *Attorney, Agent, or Firm* — Fenwick & West LLP

(57) ABSTRACT

An optical touch-sensitive device has the capability to determine touch locations of multiple simultaneous touch events. The touch events disturb optical beams propagating across the touch sensitive surface. With multi-touch events, a single beam can be disturbed by more than one touch event. In one aspect, a non-linear transform is applied to measurements of the optical beams in order to linearize the effects of multiple touch events on a single optical beam. In another aspect, the effect of known touch events (i.e., reference touches) is modeled in advance, and then unknown touch events are determined with respect to the reference touches.

39 Claims, 14 Drawing Sheets

(56) References Cited

OTHER PUBLICATIONS

Bayati, M. et al., "Universality in Polytope Phase Transitions and Message Passing Algorithms," The Annals of Applied Probability, 2015, pp. 753-822, vol. 25, No. 23.

Blumensath, T. et al., "Iterative Hard Thresholding and $L_0$ Regularisation," IEEE International Conference on Acoustics, Speech and Signal Processing, ICASSP 2007, 2007, pp. III-877-III-880.

Catalyurek, U.V. et al., "Hypergraph-Partitioning-Based Decomposition for Parallel Sparse-Matrix Vector Multiplication," IEEE Transactions on Parallel and Distributed Systems, Jul. 1999, pp. 673-693, vol. 10, No. 7.

Candes, E.J. et al., "An Introduction to Compressive Sampling," IEEE Signal Processing Magazine, Mar. 2008, pp. 21-30, vol. 25, No. 2.

Maleki, A. et al., "Optimally Tuned Iterative Reconstruction Algorithms for Compressed Sensing," IEEE Journal of Selected Topics in Signal Processing, Apr. 2010, pp. 330-341, vol. 4, No. 2.

Strohmer, T. et al., "A Randomized Kaczmarz Algorithm with Exponential Convergence," J. Fourier Anal. Appl., 2009, pp. 262-278, vol. 15.

* cited by examiner $$\begin{pmatrix} b1 \\ b2 \\ \cdots \\ b5 \\ \cdots \\ bB \end{pmatrix} = \begin{pmatrix} m11 & m12 & \cdots & m1P \\ \cdots & m22 & \cdots & \cdots \\ \cdots & \cdots & \cdots & \cdots \\ \cdots & m52 & \cdots & \cdots \\ \cdots & \cdots & \cdots & \cdots \\ mB1 & mB2 & \cdots & mBP \end{pmatrix} \cdot \begin{pmatrix} p1 \\ p2 \\ \cdots \\ \cdots \\ pP \end{pmatrix}$$

FIG. 13

$$\begin{pmatrix} p1' \\ p2' \\ \cdots \\ pP' \end{pmatrix} = \begin{pmatrix} r11 & \cdots & \cdots & \cdots & \cdots & r1B \\ r21 & r22 & \cdots & r25 & \cdots & r2B \\ \cdots & \cdots & \cdots & \cdots & \cdots & \cdots \\ rP1 & \cdots & \cdots & \cdots & \cdots & rPB \end{pmatrix} \cdot \begin{pmatrix} b1 \\ b2 \\ \cdots \\ b5 \\ \cdots \\ bB \end{pmatrix}$$

$$\begin{pmatrix} r11 & \cdots & \cdots & \cdots & \cdots & r1B \\ 0 & r22 & 0 & r25 & 0 & 0 \\ \cdots & \cdots & \cdots & \cdots & \cdots & \cdots \\ rP1 & \cdots & \cdots & \cdots & \cdots & rPB \end{pmatrix}$$

FIG. 14

OPTICAL TOUCH TOMOGRAPHY

CROSS REFERENCE TO RELATED APPLICATION(S)

This application claims priority under 35 U.S.C. §119(e) to U.S. Provisional Patent Application Ser. No. 61/732,225, "Optical Touch Tomography," filed Nov. 30, 2012 by Julien Poit et al. The subject matter of all of the foregoing is incorporated herein by reference in their entirety.

BACKGROUND

1. Field of Art

This invention generally relates to detecting and resolving touch events on a touch-sensitive device, and in particular to detecting and resolving multi-touch events.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

However, many of these approaches currently suffer from drawbacks. For example, some technologies may function well for small sized displays, as used in many modern mobile phones, but do not scale well to larger screen sizes as in displays used with laptop or even desktop computers. For technologies that require a specially processed surface or the use of special elements in the surface, increasing the screen size by a linear factor of N means that the special processing must be scaled to handle the $N^2$ larger area of the screen or that $N^2$ times as many special elements are required. This can result in unacceptably low yields or prohibitively high costs.

Another drawback for some technologies is their inability or difficulty in handling multi-touch events. A multi-touch event occurs when multiple touch events occur simultaneously. This can introduce ambiguities in the raw detected signals, which then must be resolved. Importantly, the ambiguities must be resolved in a speedy and computationally efficient manner. If too slow, then the technology will not be able to deliver the touch sampling rate required by the system. If too computationally intensive, then this will drive up the cost and power consumption of the technology.

Another drawback is that technologies may not be able to meet increasing resolution demands. Assume that the touch-sensitive surface is rectangular with length and width dimensions L×W. Further assume that an application requires that touch points be located with an accuracy of $\delta l$ and $\delta w$, respectively. The effective required resolution is then $R=(LW)/(\delta l \, \delta w)$. We will express R as the effective number of touch points. As technology progresses, the numerator in R generally will increase and the denominator generally will decrease, thus leading to an overall increasing trend for the required touch resolution R.

Thus, there is a need for improved touch-sensitive systems.

SUMMARY

An optical touch-sensitive device has the capability to determine touch locations of multiple simultaneous touch events. The touch events disturb optical beams propagating across the touch sensitive surface. With multi-touch events, a single beam can be disturbed by more than one touch event. In one aspect, a non-linear transform is applied to measurements of the optical beams in order to linearize the effects of multiple touch events on a single optical beam. In another aspect, the effect of known touch events (i.e., reference touches) is modeled in advance, and then unknown touch events are determined with respect to the reference touches.

In some embodiments, beam measurement values resulting from the multi-touch event are received. The beam measurement values result from different optical beams transmitted across the touch sensitive surface, where the multi-touch event disturbs optical beams in a vicinity of touch regions. Binding value estimates are determined based on the optical beam measurement values and a model based on a transfer function. The binding value estimates are a measure of the optical beam disturbances relative to the reference touches. The transfer function is a transfer function from the binding values to the optical beam measurements. The transfer function is linear.

Touch regions (e.g., touch locations) for the individual touch events in the multi-touch event are determined from the binding value estimates. Optionally, one or more other physical attributes of the touch events are also determined. In some embodiments, a type of object (e.g., a finger, stylus, pen and so on) producing the multi-touch event is identified based on one or more properties of the multi-touch event (e.g., a shape of a touch region, an area of a touch region, dimensions of a touch region, pressure profiles or gradients of a touch event, pressure values of touch event, and the like).

In another aspect, an optical touch-sensitive device includes multiple emitters and detectors located along a periphery of a touch sensitive surface. Each emitter produces optical beams which are received by the detectors. The optical beams preferably are multiplexed in a manner so that many optical beams can be received by a detector simultaneously. The multi-touch event comprises concurrent touch events at various touch regions of the touch sensitive surface which interact with the optical beams.

Other aspects include components, devices, systems, method, processes, software, applications, improvements and other technology related to the above.

BRIEF DESCRIPTION OF DRAWINGS

Embodiments of the present invention will now be described, by way of example, with reference to the accompanying drawings, in which:

FIG. 13 illustrates a matrix formulation of a transfer function M from binding values p to optical beam measurements b.

FIG. 14 illustrates an inversion of the matrix formulation of FIG. 13.

DETAILED DESCRIPTION

I. Introduction

A. Device Overview

Figure 1:
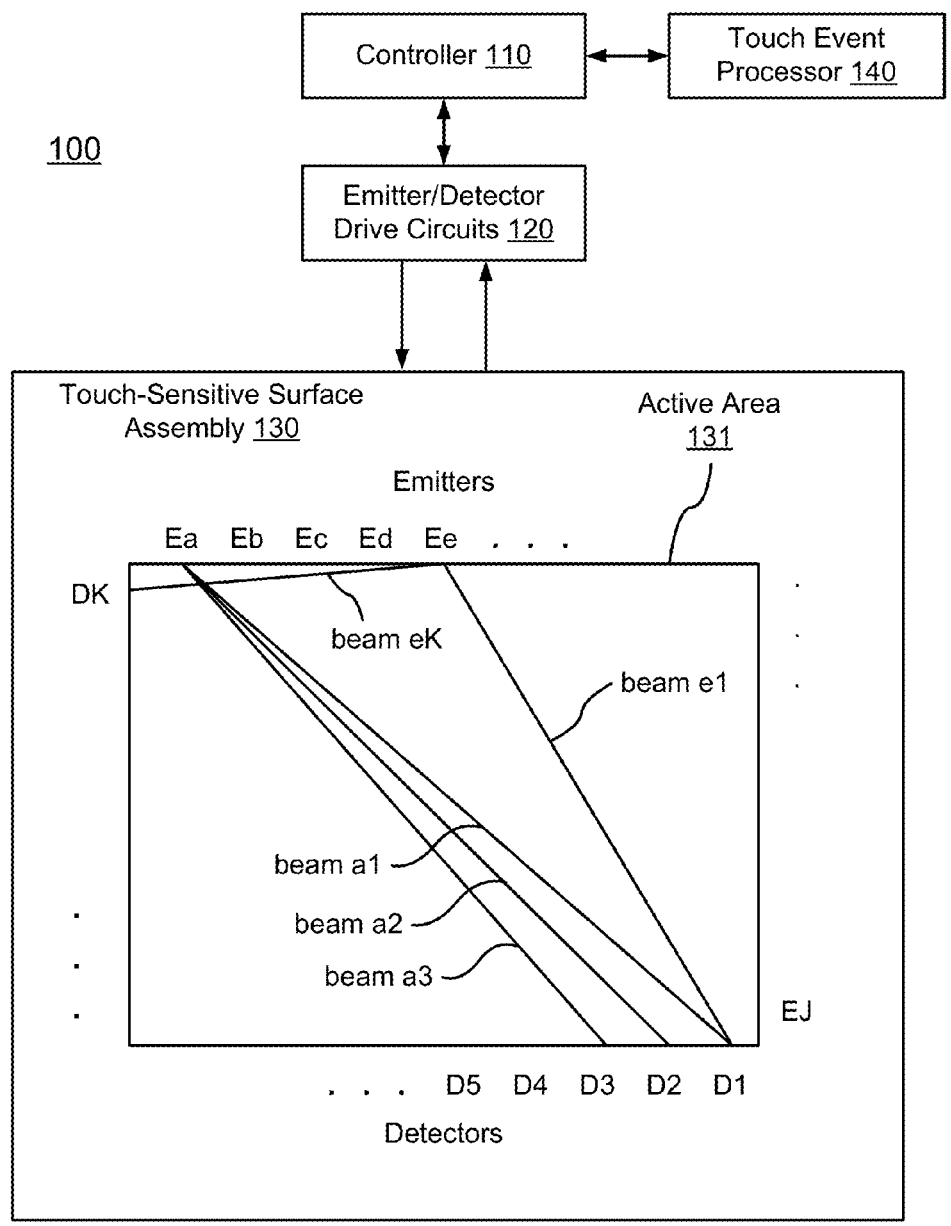
FIG. 1 is a diagram of an optical touch-sensitive device, according to one embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active area or active surface, even though the surface itself may be an entirely passive structure. The assembly 130 also includes emitters and detectors arranged along the periphery of the active surface 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes. Since the emitters and detectors are positioned around the periphery, increasing the screen size by a linear factor of N means that the periphery also scales by a factor of N rather than $N^2$.

B. Process Overview

Figure 2:
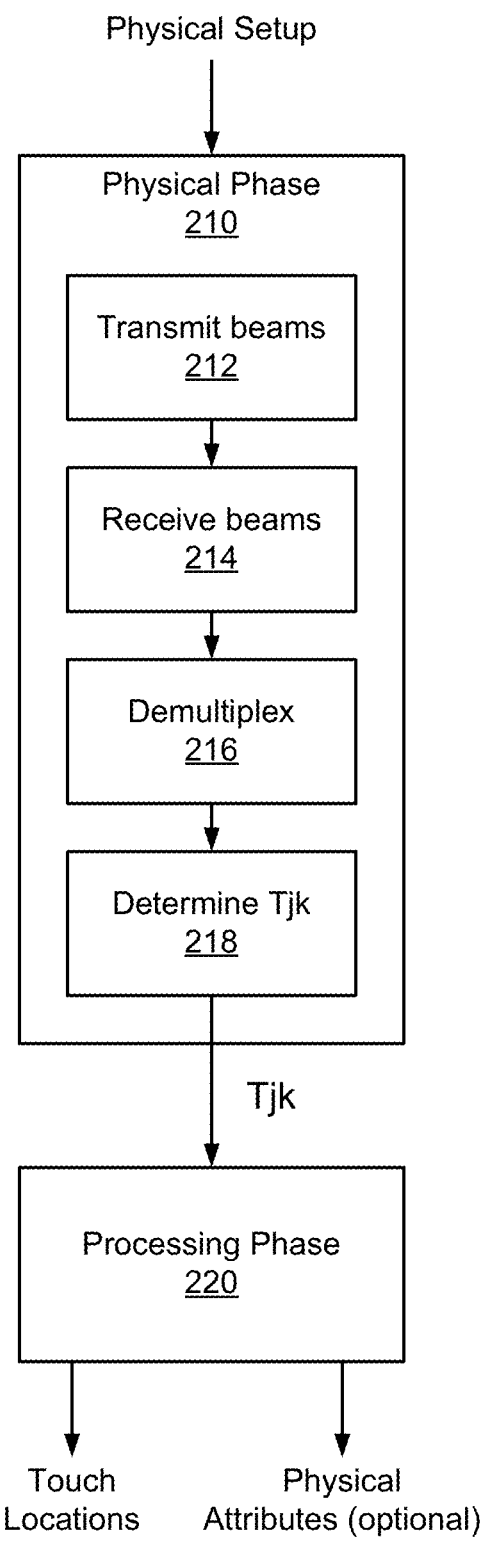
FIG. 2 is a flow diagram for determining the locations of touch events, according to one embodiment.

FIG. 2 is a flow diagram for determining the locations of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to a baseline transmittance for that beam. A baseline transmittance for the optical beam is what would have been transmitted from emitter j to detector k if there was no touch event interacting with the optical beam. In some cases, the baseline transmittance may be measured before a touch event is detected or may be an average of a specified number of previously recorded transmittance measurements made during the absence of touch events. In some cases, the baseline transmittance may be an average of past recorded transmittance measurements. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section II.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218 by comparing (e.g., dividing) the transmittance of beam jk during the touch event to a baseline transmittance of beam jk.

The processing phase 220 obtains the Tjk measurements resulting from the multi-touch event from physical phase 210, and determines touch regions corresponding to one or more touch events in the multi-touch event. Processing phase 220 may also determine one or more physical attributes (e.g., touch or contact pressure, pressure gradients, spatial pressure distributions, optical transmission properties and so on) of the touch events in the multi-touch event. Processing phase 220 is described further in Section III below.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as an SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Figure 3A:
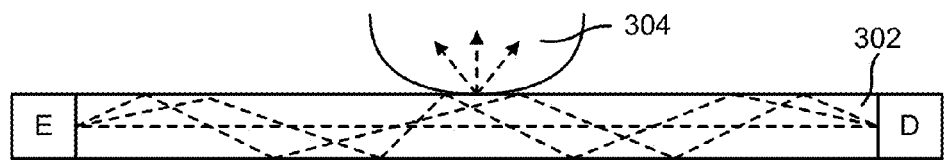
FIGS. 3A-3F illustrate different mechanisms for a touch interaction with an optical beam.

FIGS. 3A-3F illustrate different mechanisms for a touch interaction with an optical beam. FIG. 3A illustrates a mechanism based on frustrated total internal reflection (TIR). The optical beam, shown as a dashed line, travels from emitter E to detector D through an optically transparent waveguide 302. The beam is confined to the waveguide 302 by total internal reflection. The waveguide may be constructed of plastic or glass, for example. An object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

Figure 3B:

FIG. 3B illustrates a mechanism based on beam blockage. Emitters produce beams which are in close proximity to a surface 306. An object 304 coming into contact with the surface 306 will partially or entirely block beams within the contact area. FIGS. 3A and 3B illustrate some physical mechanisms for touch interactions, but other mechanisms can also be used. For example, the touch interaction may be based on changes in polarization, scattering, or changes in propagation direction or propagation angle (either vertically or horizontally).

Figure 3C:
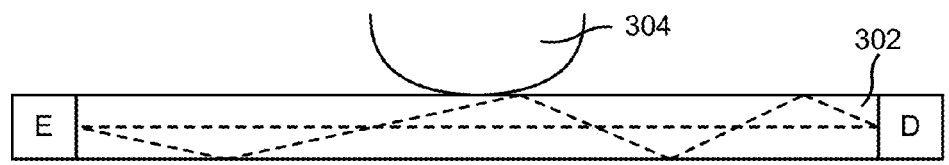

For example, FIG. 3C illustrates a different mechanism based on propagation angle. In this example, the optical beam is guided in a waveguide 302 via TIR. The optical beam hits the waveguide-air interface at a certain angle and is reflected back at the same angle. However, the touch 304 changes the angle at which the optical beam is propagating. In FIG. 3C, the optical beam travels at a steeper angle of propagation after the touch 304. The detector D has a response that varies as a function of the angle of propagation. The detector D could be more sensitive to the optical beam travelling at the original angle of propagation or it could be less sensitive. Regardless, an optical beam that is disturbed by a touch 304 will produce a different response at detector D.

Figure 3D:
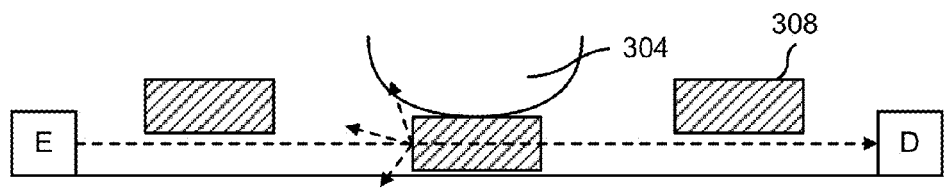

In FIGS. 3A-3C, the touching object was also the object that interacted with the beam. This will be referred to as a direct interaction. In an indirect interaction, the touching object interacts with an intermediate object, which interacts with the optical beam. FIG. 3D shows an example that uses intermediate blocking structures 308. Normally, these structures 308 do not block the beam. However, in FIG. 3D, object 304 contacts the blocking structure 308, which causes it to partially or entirely block the optical beam. In FIG. 3D, the structures 308 are shown as discrete objects, but they do not have to be so.

Figure 3E:
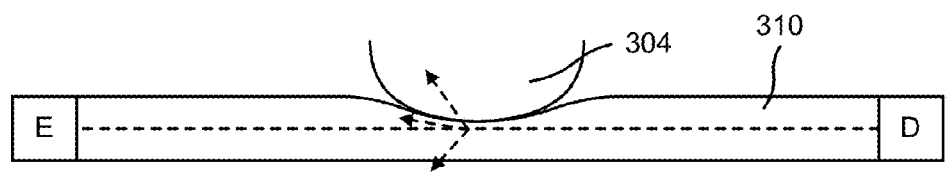

In FIG. 3E, the intermediate structure 310 is a compressible, partially transmitting sheet. When there is no touch, the sheet attenuates the beam by a certain amount. In FIG. 3E, the touch 304 compresses the sheet, thus changing the attenuation of the beam. For example, the upper part of the sheet may be more opaque than the lower part, so that compression decreases the transmittance. Alternately, the sheet may have a certain density of scattering sites. Compression increases the density in the contact area, since the same number of scattering sites occupies a smaller volume, thus decreasing the transmittance. Analogous indirect approaches can also be used for frustrated TIR. Note that this approach could be used to measure contact pressure or touch velocity, based on the degree or rate of compression.

The touch mechanism may also enhance transmission, instead of or in addition to reducing transmission. For example, the touch interaction in FIG. 3E might increase the transmission instead of reducing it. The upper part of the sheet may be more transparent than the lower part, so that compression increases the transmittance.

Figure 3F:
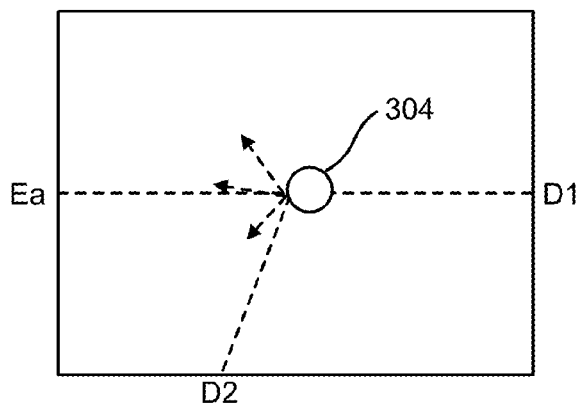

FIG. 3F shows another example where the transmittance between an emitter and detector increases due to a touch interaction. FIG. 3F is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking. Whether the touch interaction mechanism is binary or analog depends in part on the nature of the interaction between the touch and the beam. It does not depend on the lateral width of the beam (which can also be manipulated to obtain a binary or analog attenuation, as described below), although it might depend on the vertical size of the beam.

Figure 4:
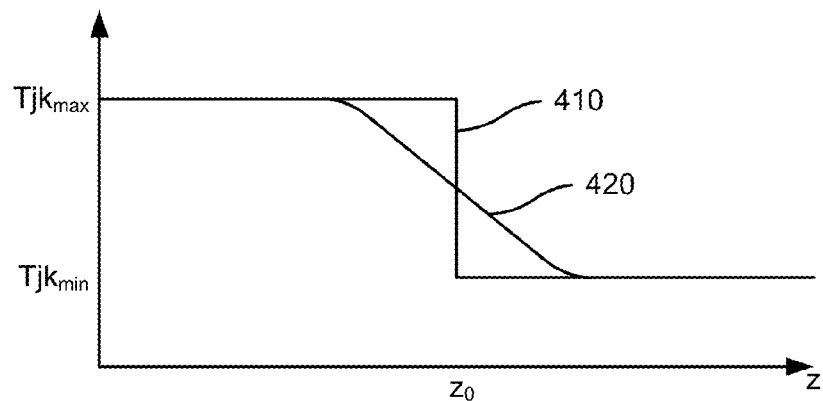
FIG. 4 are graphs of binary and analog touch interactions.

FIG. 4 is a graph illustrating a binary touch interaction mechanism compared to an analog touch interaction mechanism. FIG. 4 graphs the transmittance Tjk as a function of the depth z of the touch. The dimension z is into and out of the active surface. Curve 410 is a binary response. At low z (i.e., when the touch has not yet disturbed the beam), the transmittance Tjk is at its maximum. However, at some point $z_0$, the touch breaks the beam and the transmittance Tjk falls fairly suddenly to its minimum value. Curve 420 shows an analog response where the transition from maximum Tjk to minimum Tjk occurs over a wider range of z. If curve 420 is well behaved, it is possible to estimate z from the measured value of Tjk.

C. Emitters, Detectors and Couplers

Each emitter transmits light to a number of detectors. Usually, each emitter outputs light to more than one detector simultaneously. Similarly, each detector receives light from a number of different emitters. The optical beams may be visible, infrared and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics and other optical components.

In this disclosure, the optical paths will be shown unfolded for clarity. Thus, sources, optical beams and sensors will be shown as lying in one plane. In actual implementations, the sources and sensors typically will not lie in the same plane as the optical beams. Various coupling approaches can be used. A planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. Application Ser. No. 61/510,989 "Optical Coupler" filed on Jul. 22, 2011, which is incorporated by reference in its entirety herein.

D. Optical Beam Paths

Figures 5A, 5B, 5C:
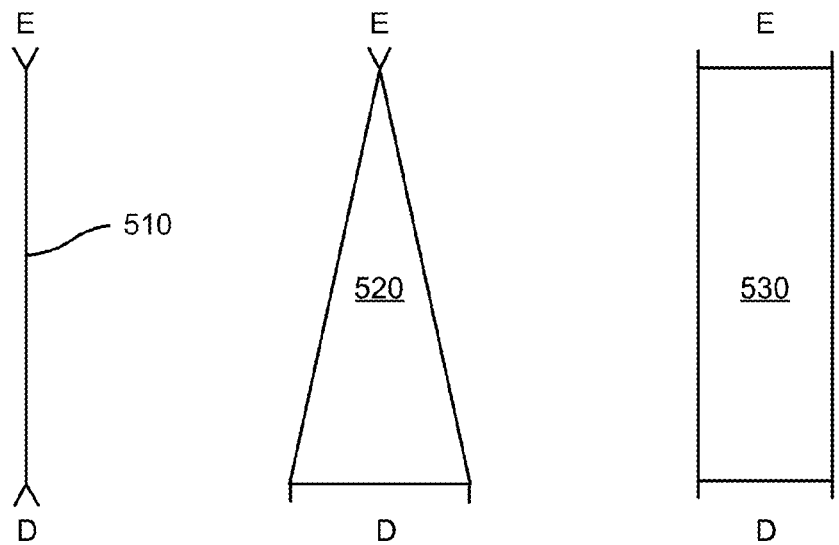
FIGS. 5A-5C are top views of differently shaped beam footprints.

Another aspect of a touch-sensitive system is the shape and location of the optical beams and beam paths. In FIGS. 1-2, the optical beams are shown as lines. These lines should be interpreted as representative of the beams, but the beams themselves are not necessarily narrow pencil beams. FIGS. 5A-5C illustrate different beam shapes.

FIG. 5A shows a point emitter E, point detector D and a narrow "pencil" beam 510 from the emitter to the detector. In FIG. 5B, a point emitter E produces a fan-shaped beam 520 received by the wide detector D. In FIG. 5C, a wide emitter E produces a "rectangular" beam 530 received by the wide detector D. These are top views of the beams and the shapes shown are the footprints of the beam paths. Thus, beam 510 has a line-like footprint, beam 520 has a triangular footprint which is narrow at the emitter and wide at the detector, and beam 530 has a fairly constant width rectangular footprint. In FIG. 5, the detectors and emitters are represented by their widths, as seen by the beam path. The actual optical sources and sensors may not be so wide. Rather, optics (e.g., cylindrical lenses or mirrors) can be used to effectively widen or narrow the lateral extent of the actual sources and sensors.

Figure 6A:
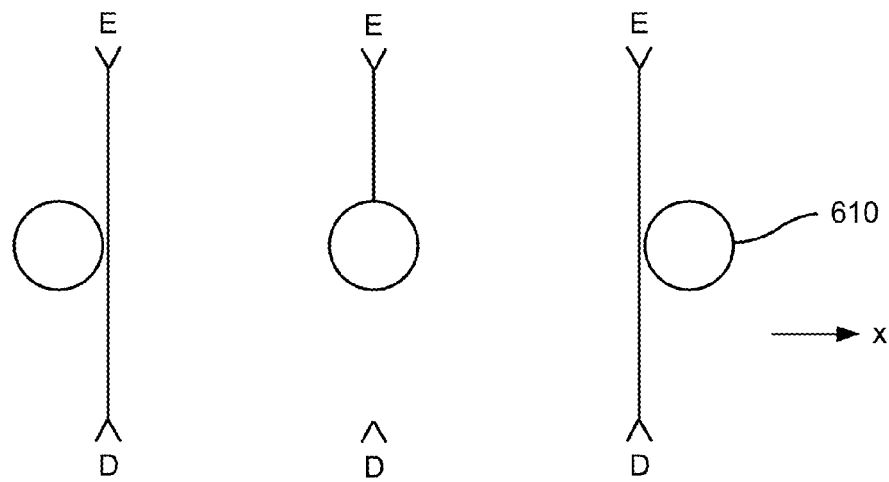
FIGS. 6A-6B are top views illustrating a touch point travelling through a narrow beam and a wide beam, respectively.
Figure 6B:
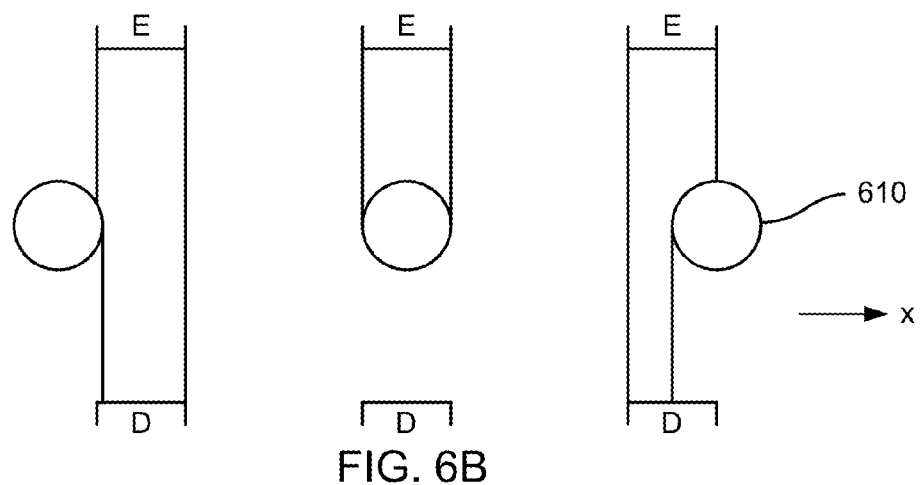
Figure 7:
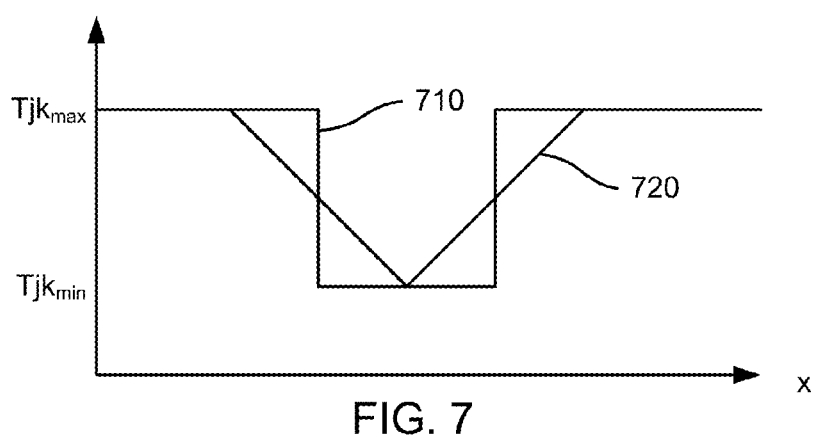
FIG. 7 are graphs of the binary and analog responses for the narrow and wide beams of FIG. 6.

FIGS. 6A-6B and 7 show how the width of the footprint can determine whether the transmission coefficient Tjk behaves as a binary or analog quantity. In these figures, a touch point has contact area 610. Assume that the touch is fully blocking, so that any light that hits contact area 610 will be blocked. FIG. 6A shows what happens as the touch point moves left to right past a narrow beam. In the leftmost situation, the beam is not blocked at all (i.e., maximum Tjk) until the right edge of the contact area 610 interrupts the beam. At this point, the beam is fully blocked (i.e., minimum Tjk), as is also the case in the middle scenario. It continues as fully blocked until the entire contact area moves through the beam. Then, the beam is again fully unblocked, as shown in the righthand scenario. Curve 710 in FIG. 7 shows the transmittance Tjk as a function of the lateral position x of the contact area 610. The sharp transitions between minimum and maximum Tjk show the binary nature of this response.

FIG. 6B shows what happens as the touch point moves left to right past a wide beam. In the leftmost scenario, the beam is just starting to be blocked. The transmittance Tjk starts to fall off but is at some value between the minimum and maximum values. The transmittance Tjk continues to fall as the touch point blocks more of the beam, until the middle situation where the beam is fully blocked. Then the transmittance Tjk starts to increase again as the contact area exits the beam, as shown in the righthand situation. Curve 720 in FIG. 7 shows the transmittance Tjk as a function of the lateral position x of the contact area 610. The transition over a broad range of x shows the analog nature of this response.

FIGS. 5-7 consider an individual beam path. In most implementations, each emitter and each detector will support multiple beam paths.

Figure 8A:
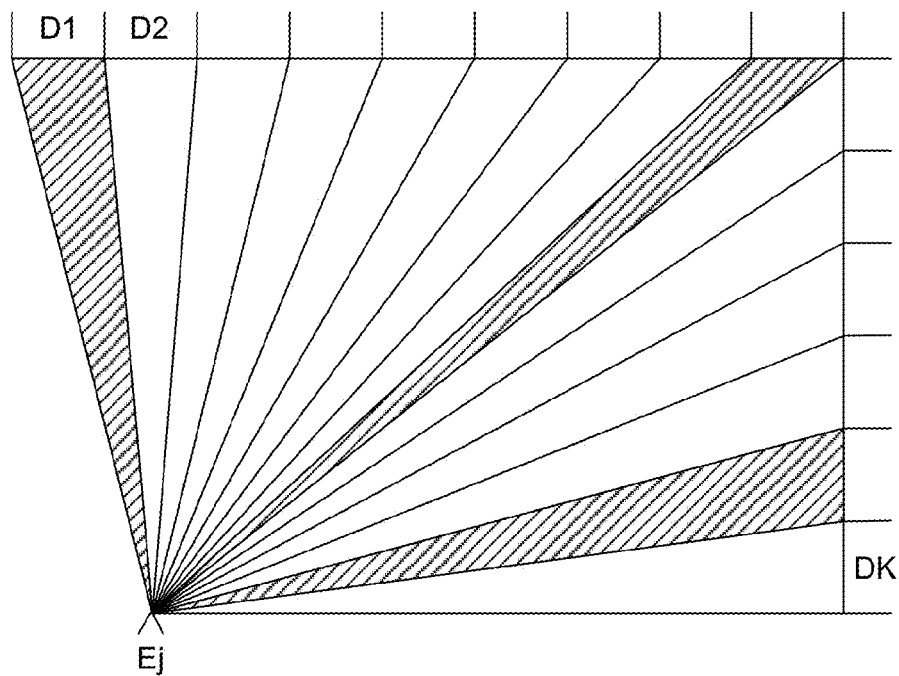
FIGS. 8A-8B are top views illustrating active area coverage by emitters.
Figure 8B:
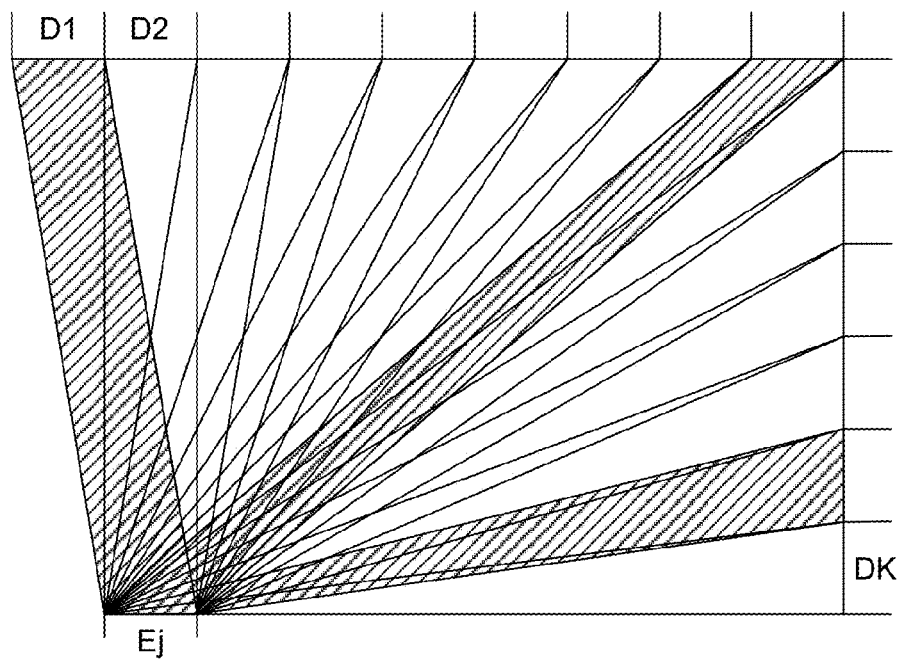

FIG. 8A is a top view illustrating the beam pattern produced by a point emitter. Emitter Ej transmits beams to wide detectors D1-DK. Three beams are shaded for clarity: beam j1, beam j(K−1) and an intermediate beam. Each beam has a fan-shaped footprint. The aggregate of all footprints is emitter Ej's coverage area. That is, any touch event that falls within emitter Ej's coverage area will disturb at least one of the beams from emitter Ej. FIG. 8B is a similar diagram, except that emitter Ej is a wide emitter and produces beams with "rectangular" footprints (actually, trapezoidal but we will refer to them as rectangular). The three shaded beams are for the same detectors as in FIG. 8A.

Note that every emitter Ej may not produce beams for every detector Dk. In FIG. 1, consider beam path aK which would go from emitter Ea to detector DK. First, the light produced by emitter Ea may not travel in this direction (i.e., the radiant angle of the emitter may not be wide enough) so there may be no physical beam at all, or the acceptance angle of the detector may not be wide enough so that the detector does not detect the incident light. Second, even if there was a beam and it was detectable, it may be ignored because the beam path is not located in a position to produce useful information. Hence, the transmission coefficients Tjk may not have values for all combinations of emitters Ej and detectors Dk.

The footprints of individual beams from an emitter and the coverage area of all beams from an emitter can be described using different quantities. Spatial extent (i.e., width), angular extent (i.e., radiant angle for emitters, acceptance angle for detectors) and footprint shape are quantities that can be used to describe individual beam paths as well as an individual emitter's coverage area.

An individual beam path from one emitter Ej to one detector Dk can be described by the emitter Ej's width, the detector Dk's width and/or the angles and shape defining the beam path between the two.

These individual beam paths can be aggregated over all detectors for one emitter Ej to produce the coverage area for emitter Ej. Emitter Ej's coverage area can be described by the emitter Ej's width, the aggregate width of the relevant detectors Dk and/or the angles and shape defining the aggregate of the beam paths from emitter Ej. Note that the individual footprints may overlap (see FIG. 8B close to the emitter). Therefore an emitter's coverage area may not be equal to the sum of its footprints. The ratio of (the sum of an emitter's footprints)/(emitter's cover area) is one measure of the amount of overlap.

The coverage areas for individual emitters can be aggregated over all emitters to obtain the overall coverage for the system. In this case, the shape of the overall coverage area is not so interesting because it should cover the entirety of the active area 131. However, not all points within the active area 131 will be covered equally. Some points may be traversed by many beam paths while other points traversed by far fewer. The distribution of beam paths over the active area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

Figure 8C:
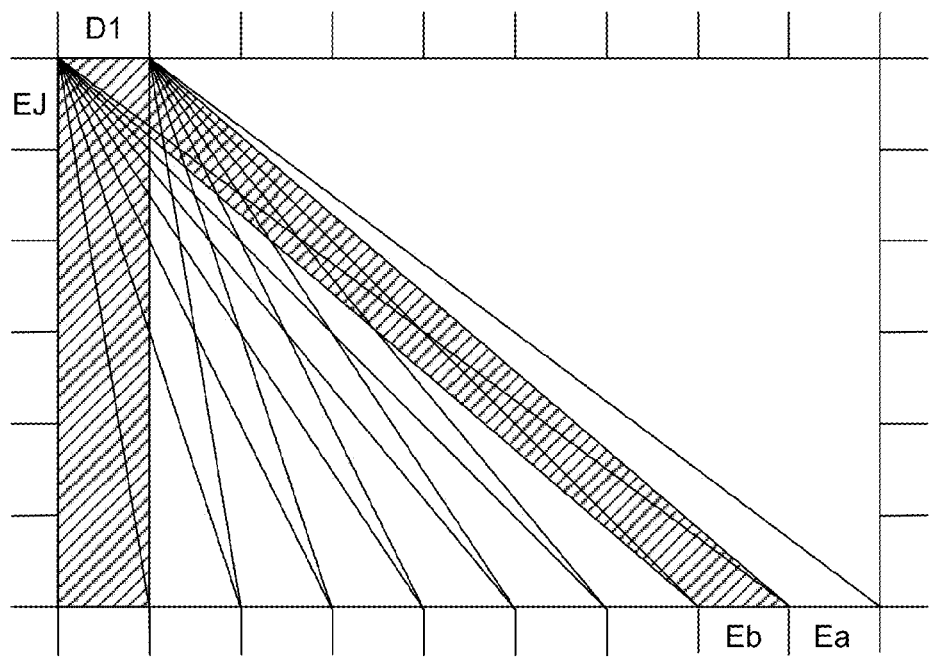
FIGS. 8C-8D are top views illustrating active area coverage by detectors.
Figure 8D:
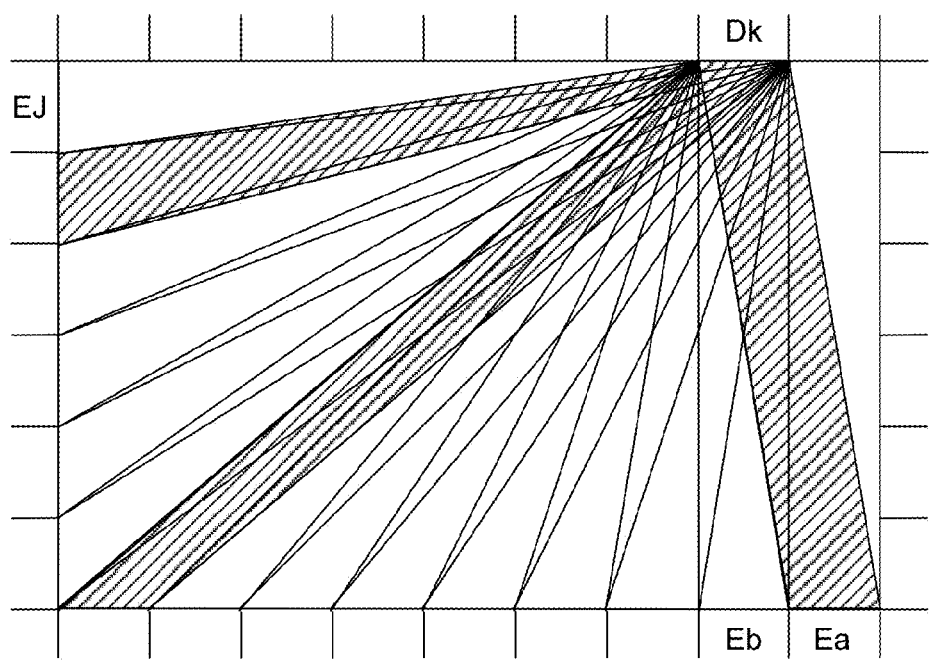

The discussion above for emitters also holds for detectors. The diagrams constructed for emitters in FIGS. 8A-8B can also be constructed for detectors. For example, FIG. 8C shows a similar diagram for detector D1 of FIG. 8B. That is, FIG. 8C shows all beam paths received by detector D1. Note that in this example, the beam paths to detector D1 are only from emitters along the bottom edge of the active area. The emitters on the left edge are not worth connecting to D1 and there are no emitters on the right edge (in this example design). FIG. 8D shows a diagram for detector Dk, which is an analogous position to emitter Ej in FIG. 8B.

A detector Dk's coverage area is then the aggregate of all footprints for beams received by a detector Dk. The aggregate of all detector coverage areas gives the overall system coverage.

In the figures, the path of a narrow "pencil" beam is shown as a straight line, which is a good representation of the actual beam path if the waveguide is near planar (e.g., when both upper and lower interfaces are parallel planes). However, this is not required. In some embodiments, the waveguide is constructed with a slowly varying thickness resulting in curved beam paths. For example, although the waveguide may appear to be substantially planar, one or more of the waveguide interfaces (e.g., top, bottom, or both) is slightly slanted, and the light trapped in the waveguide travels along a curved path. In another embodiment, the waveguide exhibits an arbitrary shape, defining a curved touch surface, for example for a car control device or for a robot skin interacting with its environment. In the case of a curved touch surface, the beam path is defined by successive reflections, each reflection occurring locally on the waveguide interface, (e.g., based on total internal reflection). In such embodiments, a shape of the waveguide is designed so that light injected by an emitter at an angle compatible with total internal reflection will undergo multiple reflections and will propagate within the waveguide without exiting the waveguide until it reaches one or more detectors, with sufficient energy. More generally, any beam path, curved or straight, that enables detecting one or more touch events may be used.

E. Active Area Coverage

The coverage of the active area 131 depends on the shapes of the beam paths, but also depends on the arrangement of emitters and detectors. In most applications, the active area is rectangular in shape, and the emitters and detectors are located along the four edges of the rectangle.

Figure 8E:
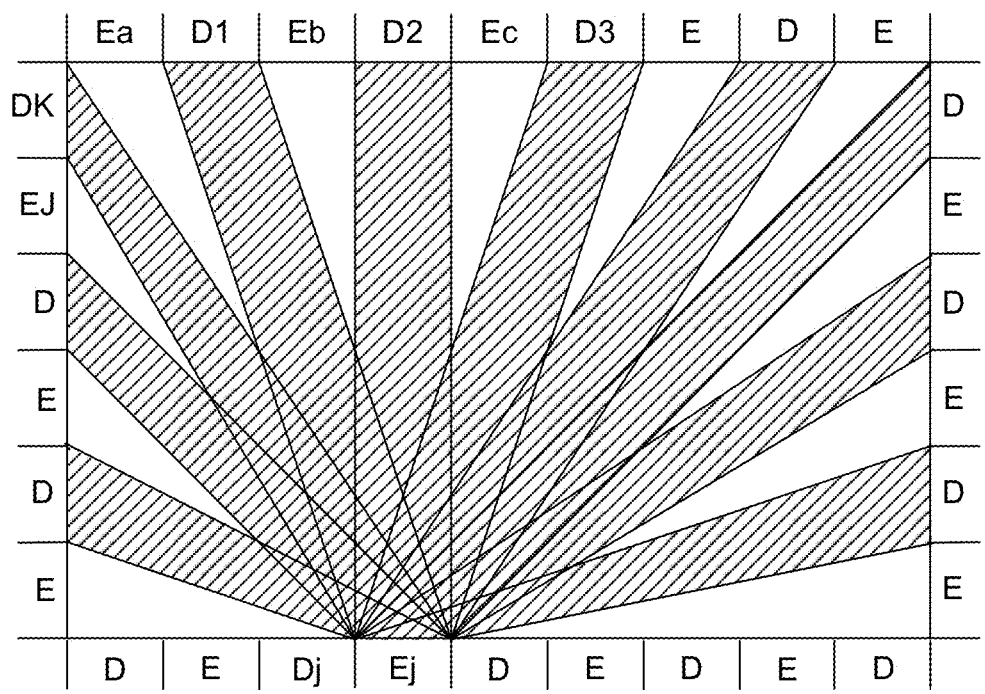
FIG. 8E is a top view illustrating alternating emitters and detectors.

In a preferred approach, rather than having only emitters along certain edges and only detectors along the other edges, emitters and detectors are interleaved along the edges. FIG. 8E shows an example of this where emitters and detectors are alternated along all four edges. The shaded beams show the coverage area for emitter Ej.

F. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. application Ser. No. 13/059,772 "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients Tjk are identified based on timing. If only time multiplexing is used, the controller must cycle through the emitters quickly enough to meet the required touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

III. Processing Phase

In the processing phase 220 of FIG. 2, the transmission coefficients Tjk are used to determine the locations of touch events and, optionally, physical attributes associated with the touch events.

A. Multi-Touch Events

A multi-touch event includes a plurality of concurrent or substantially concurrent touch events. Multi-touch events may comprise stationary or static touch events, or time-varying touch events. Examples of stationary or static multi-touch events include two finger contacts, three contacts on a touch sensitive surface, and so on. Examples of time-varying multi-touch events on a touch sensitive surface include pinch gestures, de-pinch gestures, multi-finger swipe gestures, and multi-finger tap gestures on the touch sensitive surface. A touch event may result from various objects (e.g., a human finger, a stylus or a pen) making contact with or coming within a predefined proximity range of a touch sensitive surface.

Figure 9A:
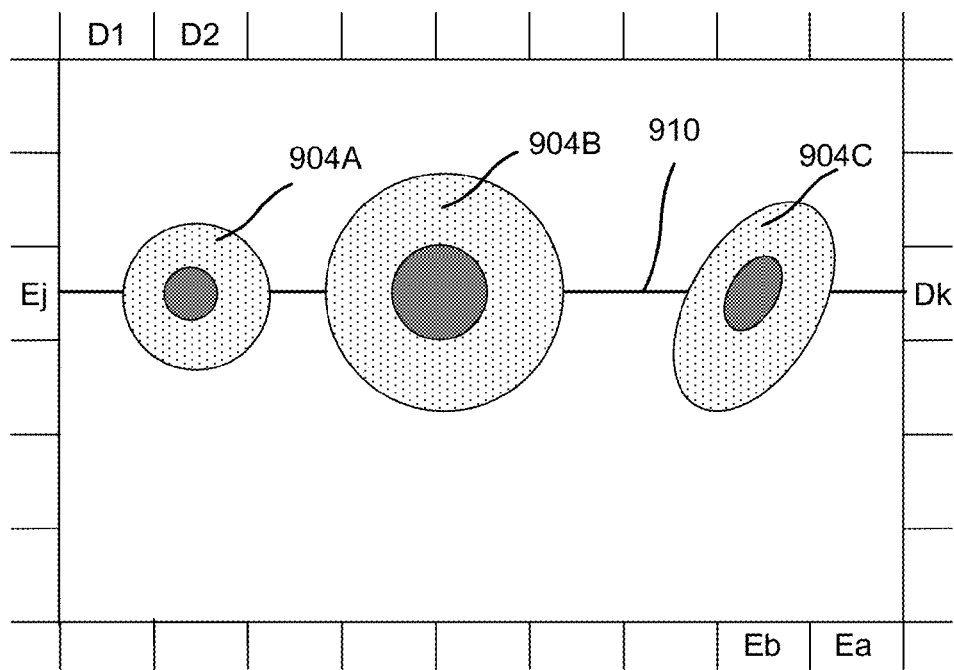
FIG. 9A is a top view illustrating an optical beam interrupted by a multi-touch event.
Figure 9B:
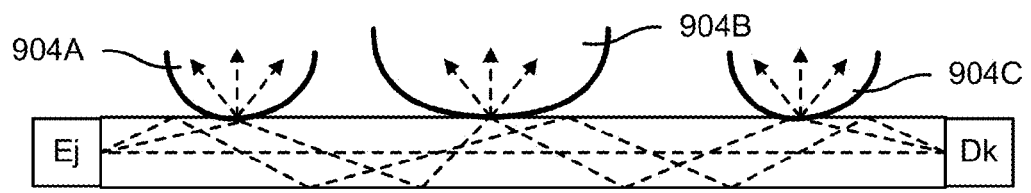
FIG. 9B is a side view illustrating touch interactions between the optical beam of FIG. 9A and the multi-touch event of FIG. 9A.

FIGS. 9A-9B (not to scale) illustrate top and side views, respectively, of a multi-touch event with three touch events 904A-C. Touch events 904 interact with optical beam 910 from emitter Ej to detector Dk. Although not illustrated in FIGS. 9A-9B, one or more of the three touch events 904 may also interact with additional beams corresponding to additional emitter-detector pairs located along the periphery of the touch sensitive surface.

Touch events 904 can be characterized by touch regions and touch profiles. A touch region of a touch event characterizes the spatial expanse of the touch event on the touch sensitive surface. Depending on the application, the touch region may be defined by different parameters. For example, the touch region can be characterized by a touch area (e.g., an area of the touch region), dimensions of the touch region (e.g., length, width, perimeter, major axis, minor axis, radius, or any other measurable dimension along the touch sensitive surface), a geometric shape of the touch region (e.g., a circle, an oval, a square, an n-gon, and so on), and/or a touch location (e.g., a central point or center of gravity) of the touch region.

Touch regions of different touch events in the same multi-touch event may or may not overlap spatially. As shown in FIGS. 9A-9B, touch regions for different touch events may differ in shape, area, dimensions, orientation, and so on. Perimeters of touch regions may be smooth, jagged, regular, symmetric, irregular, asymmetric, curvilinear, polygonal, concave, convex, closed, substantially closed, or of any other suitable shape or form.

A touch profile of a touch event represents physical attributes (e.g., touch or contact pressure, pressure gradients, spatial pressure distributions, optical transmission properties and the like) associated with the physical interaction of the touch event with the touch sensitive surface. Touch profiles for different touch events may be different. Touch pressure values, touch pressure gradients, spatial pressure distributions, and optical transmission properties may differ between any two touch events in a multi-touch event.

When multiple touch events 904 interact with an optical beam 910, a transmission coefficient Tjk for the optical beam 910 is a function of the individual transmission coefficients for each individual touch event. Contributions by each touch event 904 interfering with optical beam 910, on the combined transmission coefficient Tjk for the optical beam 910 can be modeled as multiplicative. Assume that the three touch events 904A-C each has a corresponding individual transmission coefficient TjkA-C. That is, the transmission coefficient for touch event 904A alone (if there were no touch event 904B or 904C) would be TjkA. The cumulative transmission coefficient Tjk for beam 910 may then be computed as $$Tjk = TjkA * TjkB * TjkC \quad (1)$$

The degree of interaction between a touch event and an optical beam may be represented by a binding value, as will be explained in greater detail below. For example, more scattering caused by a touch event may be represented by a greater binding value and less scattering by a smaller binding value. In FIGS. 9A-9B, the binding values are represented by the shading. In this example, each touch event has two shadings. The central solid shading represents one binding value and the outer stippled shading represents a second binding value.

Although two binding values per touch event are illustrated in FIGS. 9A-9B for simplicity, a touch event may be characterized by greater or less than two binding values. A touch event may be characterized by discrete binding values or continuously varying binding values, or a combination thereof. In some embodiments, binding values for a touch event demonstrate a monotonically increasing or decreasing trend progressively from an outer perimeter of the touch region toward a central touch location of the touch event. Alternatively, the binding values need not show a monotonic trend within a touch region. In the more specific examples given below, each touch event will be characterized by a single binding value which accounts for variation over the touch region.

B. Reference Touches

In some embodiments, a touch region and/or a touch profile for touch events are defined or computed with reference to a set of known touch events, which will be referred to as reference touches. Reference touches may be predefined, predetermined, precalibrated, or otherwise known. In addition, as will be explained below, reference touches could correspond to an actual physical touch, but that is not required. For example, reference touches could have touch regions and/or touch profiles that could not be produced by an actual touch event.

Figure 10:
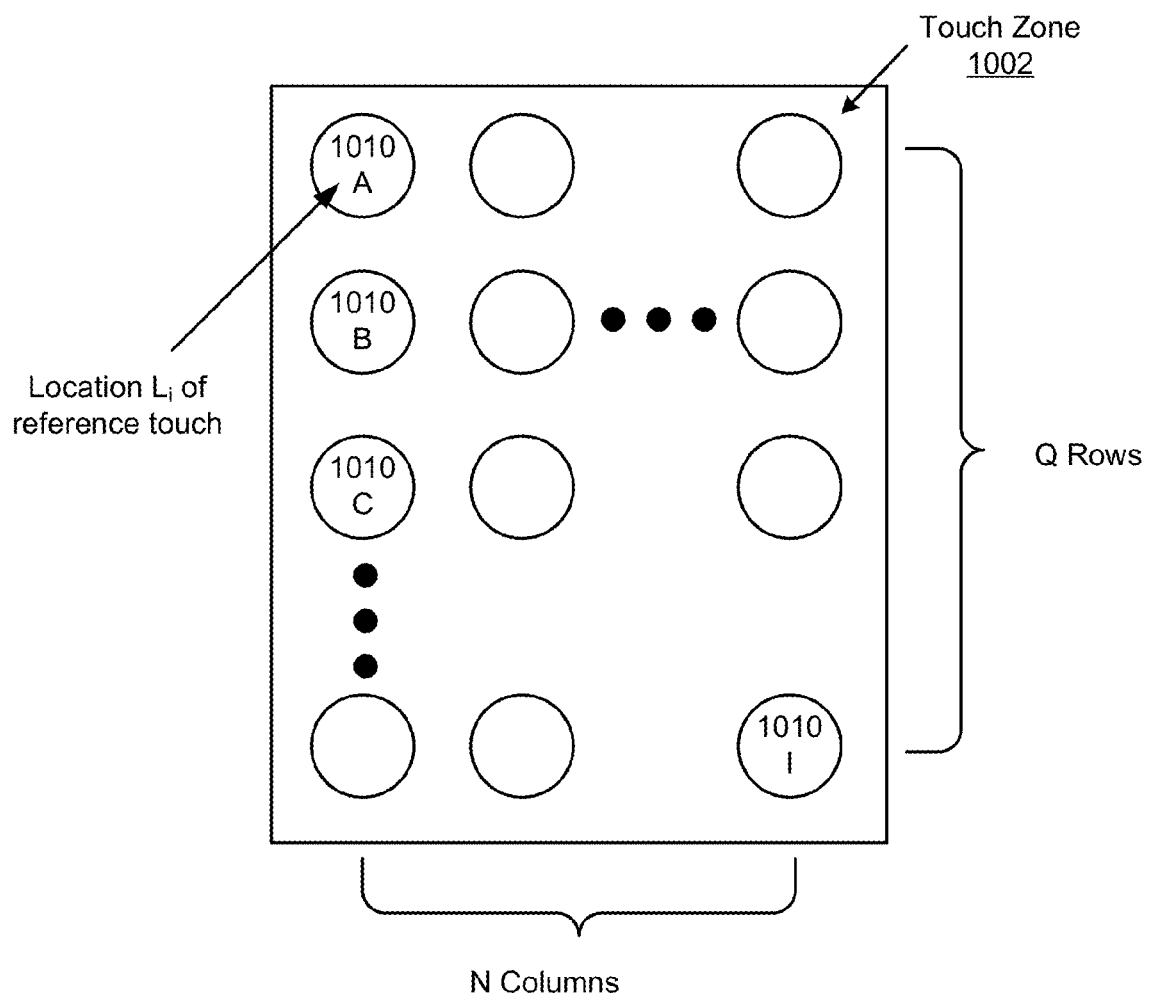
FIG. 10 is a top view illustrating a set of reference touches.

FIG. 10 is a top view illustrating a set of reference touches 1010A-I. In this example, the reference touches 1010 are positioned in a 2D grid. Each reference touch 1010 has the same touch area, dimension and shape. The locations $L_i$ of the reference touches 1010 are arranged in a regular 2D grid. The set of reference touches spans a 2D reference touch zone 1002. In many cases, the reference touch zone will span the entire active area of the touch sensitive surface. It is also possible to use different sets of reference touches for different regions of the active area, or to use multiple sets of reference touches (e.g., of varying resolution) for the same region.

C. Identifying Candidate Touch Events

Figure 11:
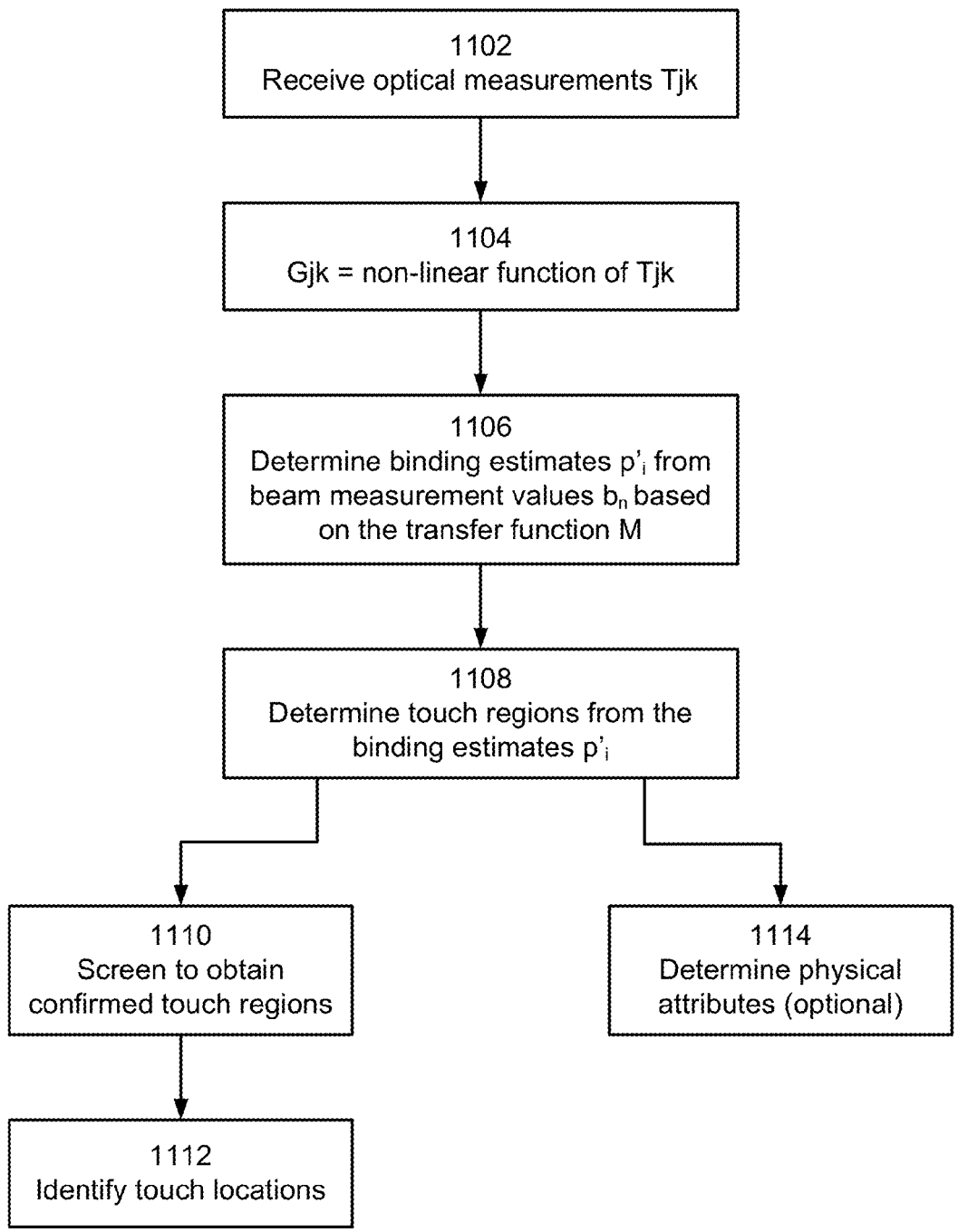
FIG. 11 is a flow diagram of a method for resolving a multi-touch event into individual touch events.

FIG. 11 is a flow diagram of a method for resolving a multi-touch event into individual touch events. It is an example of the processing phase 220 of FIG. 2. This approach makes use of reference touches.

Optical measurements Tjk resulting from the multi-touch event are received 1102. As described above in FIG. 9, contributions by each touch event 904 interfering with an optical beam 910, on the aggregate transmission coefficient Tjk for the optical beam 910, can be modeled as multiplicative.

In some embodiments, separation of contributions from the individual touch events is simplified by making their contribution additive rather than multiplicative. This can be done by modifying the optical measurements Tjk based on a non-linear function. In such embodiments, the non-linear function modifies the multiplicative contribution of individual transmission coefficients into additive contributions, thereby facilitating subsequent matrix representation and manipulation. The logarithmic function has a property (referred to herein as a separation property) to modify a multiplicative relationship between variables to an additive relationship.

Accordingly, beam measurement values Gjk are calculated 1104 from the received optical measurements Tjk using a non-linear function. To convert a multiplicative relation to a linear one, a log function can be used: Gjk=log Tjk. Other examples of non-linear functions with the separation property include other basis logarithmic functions, and linearized approximations of logarithmic functions (e.g., a Taylor series expansion). For example, applying the log transform converts Eqn. (1) to $$Gjk = GjkA + GjkB + GjkC \quad (2)$$

Similarly, a first order Taylor series expansion of log Tjk around 1 results in −(1−Tjk). The coefficient (1−Tjk) physically represents a loss coefficient (e.g., as opposed to a transmittance coefficient) for beam jk.

The linearization resulting from such transforms facilitates the use of matrices. The touch interaction can be characterized as $$b = Mp \quad (3)$$

This equation is illustrated in FIG. 13. Column vector p contains binding values $p_i$ which correspond to the reference touches. For example, binding value $p_i$ might correspond to the reference touch at location $L_i$. Column vector b contains beam measurement values $b_n$. For example, each $b_n$ might correspond to one of the Gjk (where a reordering from the two dimensions jk to the one dimension n is also performed).

Matrix M is then a transfer function that describes the effect of each reference touch on each of the beam measurement values. For example, consider the second column of matrix M, shaded in gray in FIG. 13. This column represents the beam measurement values b in response to the presence of reference touch 2 (i.e., $p_2$=1) and no other reference touches (i.e., all other $p_i$=0). The binding values that correspond to the presence of a reference touch do not have to be chosen as 1. Other values could be chosen, and matrix M would be adjusted accordingly.

In Eqn. (3), given the binding values p, we can calculate the beam measurement values b. We solve the inverse problem. Estimates $p'_i$ of the binding values are determined 1106 for the multi-touch event from beam measurement values $b_n$ based on the transfer function M.

In some embodiments, binding value estimates $p'_i$ are determined by computing a pseudo-inverse matrix R corresponding to transfer function M. Column vector p' of binding value estimates $p'_i$ can be determined based on the equation:

$$p' = Rb \quad (4)$$

where $R = M^{-1}$. Other inversion processes can also be used. For example, p' may be determined by minimizing the difference, distance or error between the measured b and M p'.

Figure 12:
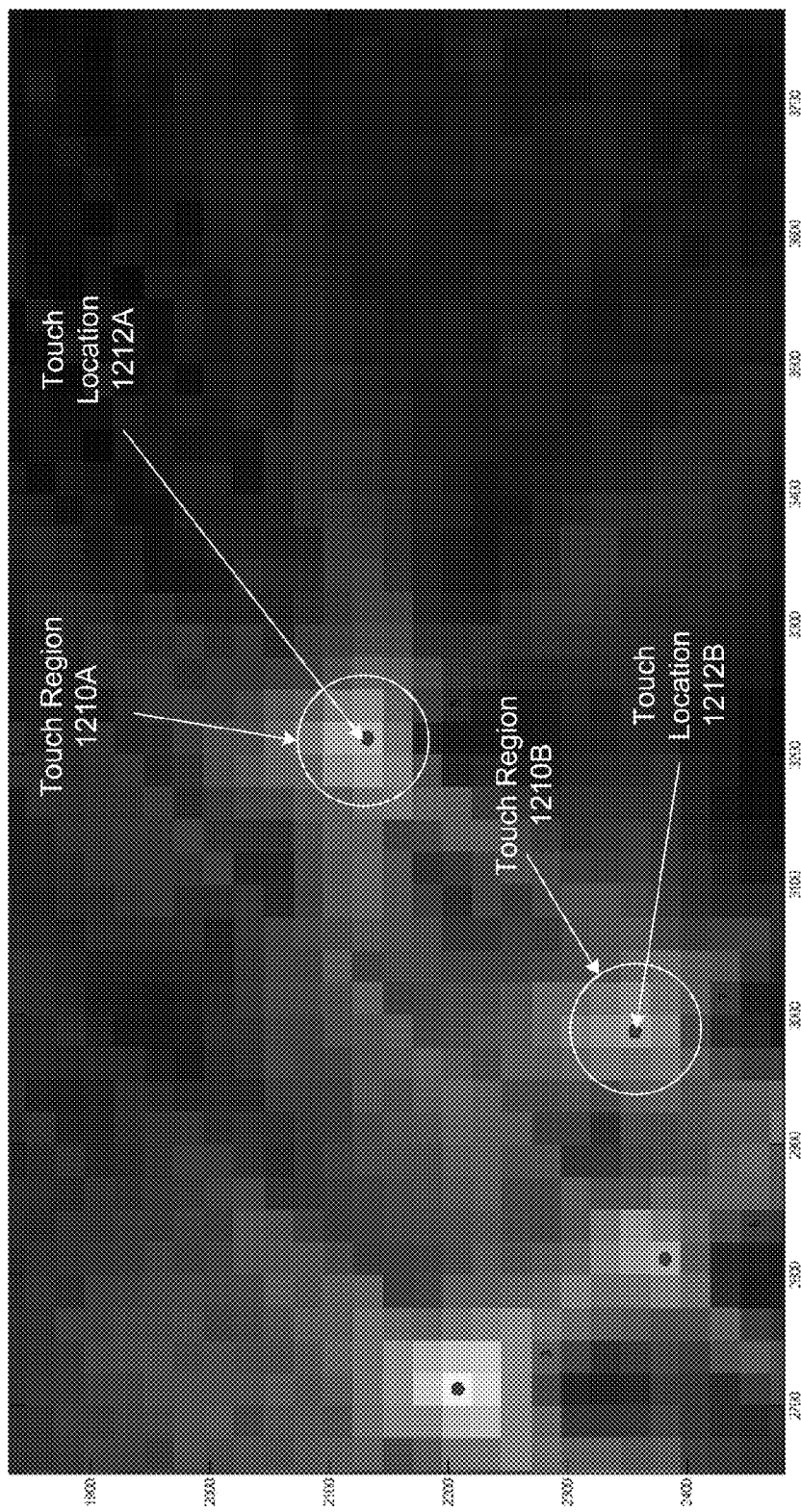
FIG. 12 is a grayscale image of binding value estimates for a touch sensitive surface.

Binding value estimates $p'_i$ provide an estimate of the binding value for the multi-touch event to reference touch i. FIG. 12 is a grayscale image of binding value estimates for a touch sensitive surface. In this example, each pixel in the grayscale image represents a different binding value and has a 2.5 mm width and a 2.5 mm breadth. White represents stronger binding values and black represents weaker binding values. In some embodiments, the binding value estimates may represent physical attributes of the touch events (e.g., average coupling between finger and glass based on a type of finger contact—dry or oily, firm or loose, and so on) in comparison to the reference touch.

Touch regions corresponding to one or more of the touch events for the multi-touch event are determined 1108 from the binding value estimates $p'_i$. In some embodiments, the reference touches are selected to be smaller than typical touch events. In that case, a touch event typically extends over multiple reference touches. As illustrated in FIG. 12, the binding value estimates $p'_i$ that correspond to touch events can appear as localized blobs (2D view) or hills (3D view), such as localized regions of stronger binding values around touch regions 1210A and 1210B. Stated differently, an actual touch event is represented as a combination of multiple adjacent reference touches and will effect more than one binding value estimate $p'_i$. This effect can be used to detect touch locations in real time by searching for localized blobs.

For example, in some applications, the optical beam measurements are recorded periodically, and an "image" of binding value estimates is produced after each optical beam measurement is made. Accordingly, an image for each set of optical beam measurements is produced at a predetermined frame rate (e.g., typically between 20 Hz and 200 Hz). Various methods of pattern recognition from fields such as machine vision may be used to detect candidate touch regions in these images produced from successive sets of beam measurements. One such method is blob detection, as described above.

Another method is peak finding. Peak finding is detecting a touch region when a peak, or maximum, is detected in a 2D coordinate system, for example along multiple directions—such as, a horizontal direction, a vertical direction and, optionally, along diagonal directions. This is achieved by examining successive groups of typically n×n spatial units or pixels (e.g., a 3×3 group of pixels); pixels defined as spatial units comprising one or more reference touch regions or formed by interpolating between adjacent reference touch regions. For each group of spatial units or pixels, a peak condition is examined. If the peak condition is met, then the spatial unit is determined to be a peak or to include a peak and is identified as a candidate touch region. This method implements a binary classification in which a group of n×n spatial units or pixels is determined either to be a candidate touch region or not.

In some embodiments, more elaborate classification methods that use features (e.g., cornerness, curvature, Hessian, and so on) extracted from the images are implemented to detect candidate touch regions. For example, grey-scale classification approaches for pixels or spatial units of binding value estimates provide non-binary classification measures or scores—e.g., a classification measure or score increases (e.g., continuously) for a spatial unit when a likelihood of the spatial unit being a candidate touch region increases. A true touch event typically manifests as increasing binding values observed over multiple adjacent pixels or spatial units. In such cases, a pixel with a high (e.g., greater than a specified score threshold) classification measure or score might be spatially surrounded by adjacent pixels having a high classification measures or scores (e.g., scores greater than the specified score threshold). A central location of the true touch event is usually the central pixel or the pixel with highest classification score.

In some embodiments, a threshold is then applied to the non-binary classification measures or scores to determine whether or not the spatial unit or pixel is or includes a candidate touch region. A lower threshold enables sensitive touch detection but may result in higher false positives resulting from noise or imperfections in the inversion process of the transfer function M. In such embodiments, a threshold is dynamically controlled, adjusted or otherwise modified based on noise estimation, distance to candidate touch regions (based on predictions made from previous image frames), pixel position relative to the active touch zone, and the like.

D. Interpolation

In some embodiments, prior to determining candidate touch regions, to increase the number of spatial units or pixels in the 2D image of binding value estimates, additional spatial units or pixels are defined between existing pixels; and binding value estimates for the additional pixels are ascertained by methods such as numerical interpolation. As a result, spatial resolution may be improved on the 2D image of binding value estimates without making the linear system underdetermined.

In alternative embodiments, the number of pixels is increased (for improved spatial resolution while maintaining an overdetermined system) by using multiple transfer functions M, each transfer function representing an overdetermined system of equations, and optionally by defining multiple pseudo-inverse matrices R. For example, to double the number of pixels, a second transfer function may be defined using a set of shifted reference touch regions (e.g., based on a specified offset relative to the locations of reference touch regions used to compute the first transfer function). This method produces images with an increased number of binding value estimates allowing for improved spatial sampling of the images.

Along similar lines, a first set of reference touches may be defined and a corresponding transfer function M and pseudo-inverse matrix R, computed. Then, three additional transfer functions M and three additional corresponding pseudo-inverse matrices R may be defined for three additional sets or reference touches obtained by offsetting the first set of reference touches by half the pitch in three cardinal directions—horizontal, vertical, and along both axes jointly (i.e., diagonal). For example, in the grayscale image of FIG. 12, each pixel has a dimension 2.5 mm×2.5 mm and is originally separated from an adjacent pixel by a pitch of 5 mm, resulting in poor spatial resolution. However, by using three additional transfer functions M, corresponding to half-pitch offsets in the vertical and horizontal direction, the effective interpolated pitch is reduced to 2.5 mm, thereby producing an improved effective spatial resolution in both directions. Effective spatial resolution can be similarly improved by any combination of numeric multiples in the horizontal and vertical directions (e.g., 2× in the horizontal direction, 3× in the vertical direction, and so on).

E. Screening

Continuing along method 220 in FIG. 11, after (e.g., candidate) touch regions are determined 1108, the candidate touch regions are screened 1110 to reject false positives and to obtain confirmed touch regions. In some embodiments, false positives result from measurement noise, or from imperfect evaluation of the binding value estimates (e.g., computational inaccuracies in determining an inversion process for transfer function M).

In some embodiments, to reject false positive touch regions, a binding value at a center of a certain candidate touch region is compared to a specified (e.g., predetermined) threshold; if the binding value is greater than the specified threshold, then that certain candidate touch region is determined to be confirmed touch region.

In some embodiments, candidate touch regions may also be rejected as false positives by applying thresholds or rejection criteria based on shapes, sizes (e.g., area of touch region, perimeter of touch region), dimensions, and the like. For example, a candidate touch region having an area larger than a specified area threshold may be rejected as a false positive (e.g., produced by a user's palm making contact with the touch sensitive surface). On the other hand, a candidate touch region having an area less than a specified area threshold may also be rejected as a false positive (e.g., as a touch event too small to be a human finger, but more likely produced by noise or accident). In some embodiments, dimensions of touch regions are estimated by fitting a model or geometric shape (e.g., a paraboloid, a Gaussian, and so on) to the binding value estimates around a central location (e.g., a peak binding value) of a candidate touch region. Dimensions of the touch region are then evaluated based on the model best fit parameter(s) and the candidate touch region is discarded or rejected as a false positive if the dimensions do not fall within specified range.

In some embodiments, candidate touch regions may also be rejected as false positives by ignoring or ascribing a lower weight to optical beams that contributed to other candidate or confirmed touch regions when estimating binding values from beam measurements.

In some embodiments, a candidate touch region is rejected as a false positive by using an aggregation of multiple successive images over time. A candidate touch region may be accepted as a confirmed touch region if it demonstrates a specified level of agreement with corresponding candidate touch regions from one or more previous frames (e.g., between 1 to 5 previous frames). A measure of agreement between two or more candidate touch regions from two or more corresponding image frames is optionally determined using comparison parameters such as speed of movement of the candidate touch regions, direction of movement of the candidate touch regions, positions of the candidate touch regions, binding values of the candidate touch regions, shape dimensions (e.g., model best fit parameters) of the candidate touch regions, and the like. The measure of agreement is optionally evaluated based on the knn (K nearest neighbor) approach, by minimizing a cost function, or using any other suitable approach. Confirmed touch regions are optionally assigned identifiers (ID) when multiple touch regions are detected.

F. Touch Locations

Further, in method 220 illustrated in FIG. 11, after screening 1110 to eliminate or reject false positives, the confirmed touch regions are further analyzed to identify 1112 touch locations for each of the confirmed touch regions, for example, by estimating central positions (e.g., touch locations 1212 for touch regions 1210, illustrated in FIG. 12). In some embodiments, touch locations for each of the confirmed touch regions can be determined with finer precision than the pixel resolution. The sub-pixel resolution may be determined based on user requirement and may be between 1/10 to 1/1000 the pixel pitch for certain applications. That is, if the reference touches are located on a 5 mm center-to-center spacing, then the touch location may be determined to a precision of 1/10 to 1/1000 of this.

In some embodiments, a touch location or central position of a confirmed touch region is evaluated by computing a center of gravity of the binding value estimates, or pixels, around a peak binding value estimate for that touch region. In alternative embodiments, the touch location is computed based on best-fit parameters (e.g., paraboloid, Gaussian model fits), or based on a location of a peak of a touch region in an interpolated image.

In some embodiments, the touch locations are estimated as absolute values relative to the reference touch locations (e.g., illustrated in FIG. 10). Alternatively, for moving or non-stationary touch events, a touch location can be computed relative to an identified touch location for the same touch event from a preceding image frame. Stated differently, relative positioning computes the relative position of a touch event at frame number f2, with respect to a position of the touch event at frame number f1 (e.g., for f2>f1). For the purpose of evaluating relative positions, methods such as peak finding and cross-correlation functions may be used. Cross-correlation may applied between the touch region from frame f1 and the same touch region for frame f2. Typically, the touch region is defined within a small spatial window around a position of peak binding value estimate.

In some embodiments, a tracking filter is applied to the confirmed touch regions or to the model parameters (e.g., before identifying touch locations). Such tracking filters include Kalman filters, alpha-beta filters, alpha-beta-gamma filters, or adaptive filters with adjustable filter coefficients (e.g., finite impulse response (FIR) or infinite impulse response (IIR) filters). Various alternative methods may be used to identify touch locations for one or more of the touch events—as absolute touch locations or as relative position shifts.

G. Physical Attributes of the Multi-Touch Event

The binding value estimates are the result of physical attributes (e.g., touch or contact pressure, pressure gradients, spatial pressure distributions, optical transmission properties and the like) associated with a physical interaction between the touch event and the touch sensitive surface.

One or more of the physical attributes of a touch event of the multi-touch event are optionally determined 1114 from the binding value estimates $p'_i$. Such physical attributes may be computed or determined relative to known physical attributes (e.g., relative to known binding values) of reference touches. For example, binding values of touch events may be reduced (e.g., a binding value of p<1) compared to those of reference touches due to different skin type or due to a reduced effective contact area (e.g., for a dry finger having numerous fingerprints). On the other hand, an improved binding value (e.g., a binding value of p>1) for the touch events relative to a reference touch could result from an oily finger having an increased effective touch area (e.g., a complete or filled fingerprint) and stronger optical coupling. Furthermore, a binding value of zero for a touch event may result from a loss of contact with the touch area.

Furthermore, a nature or type of object producing a touch event in the multi-touch event may be determined based on the one or more physical attributes (e.g., pressure profiles, optical transmission properties and so on) of the touch event, and optionally based on a touch region (e.g., dimensions, area, perimeter, shape and so on) of the touch event. An object producing a touch event may be a particular finger (e.g., an index finger, a thumb, a little finger, a ring finger and so on), or a stylus or a pen or any other suitable device or object capable of interacting with a touch sensitive surface.

H. Calibration of Transfer Function M

Transfer function M and an inversion process for M (e.g., pseudo-inverse matrix R) may be determined a priori (e.g., during design and pre-calibration of the touch sensitive device at a factory) or during run-time (e.g., updated during deployment and use of the touch sensitive device).

Figure 15:
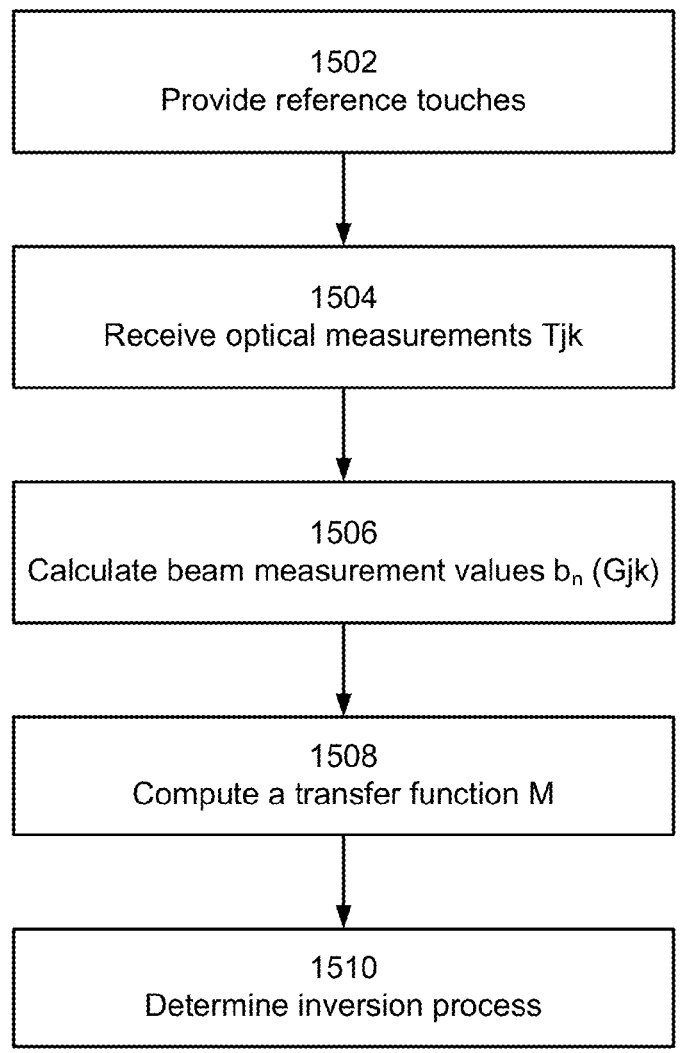
FIG. 15 is a flow diagram of a method for calibrating a transfer function M.

FIG. 15 is a flow diagram of a method for calibrating a transfer function M. In this example, the reference touches can be physically realized. Reference touches are provided 1502 on a touch sensitive surface. These reference touches are at locations $L_i$ and assume they correspond to binding values $p_i$=1. In the example of FIG. 10, reference touches are defined on a Q×N rectangular grid (e.g., 40, 60, 80, 100, 1000, etc. rows and columns). In some embodiments, reference touch regions are spaced non-uniformly to span the touch zone 1002. For example, a larger density of reference touch regions may be defined in areas where more activity is expected: the central portions of the touch zone 1002 or in the corners and periphery of the touch zone 1002. In some embodiments, reference touch regions are sized so that they overlap. In the example of FIG. 10, a preferred spacing between adjacent touch regions (e.g., a pitch) is approximately between 2 and 10 mm. The spacing is characterized by void regions; that is, the reference touch regions do not overlap. In alternative embodiments, the reference touch region can have various shapes (e.g., circles, squares, rectangles, polygons, and so on) and various sizes (e.g., uniform or non-uniform). In some embodiments, for a circular reference touch region, a radius of a reference touch region may vary with a local pitch or spacing between reference touch regions (e.g., a little larger than sqrt(2)*local_pitch). In alternative embodiments, a radius of a reference touch region is smaller than the pitch, resulting in non-overlapping reference touch regions.

In some embodiments, application of a reference touch to the touch sensitive surface can be performed by a robot, placing an artificial finger with a specified pressure at the reference touch regions at each of the locations $L_i$. In such embodiments, the artificial robotic finger optionally has characteristics similar to those of a real human finger (or in some cases, a stylus or pen). Accordingly, such an artificial finger may comprise a disc or flexible hemisphere made from or covered with a material similar in attributes to human skin (e.g., velvet, silicone, rubber, and the like), or any other similar assembly that resembles a real human finger in shape, dimensions, optical transmission, and other physical attributes.

Optical measurements Tjk resulting from the reference touches are received 1504. In some embodiments, optical measurements Tjk resulting from the reference touches are received based on one or more of the steps (e.g., steps 212-218) described with reference to the physical phase 210 of FIG. 2.

Beam measurement values $b_n$ (or Gjk) corresponding to the received optical measurements (Tjk) are calculated 1506 for the reference touches, using a non-linear function or its linearized approximation. Note that $b_n$ or b[n] corresponds to beam measurement value Gjk, the linearized transmission coefficient of the beam (j,k) from emitter Ej to detector Dk. In some embodiments, the non-linear function is a logarithmic function. In some embodiments, the logarithmic function is approximated by a Taylor expansion.

A transfer function M is computed 1508 based on the calculated beam measurement values $b_n$ resulting from reference touches $L_i$. As explained above, the transfer function M describes an effect of each of the reference touches on each of the beam measurement values. Each column i of transfer function matrix M represents optical beam measurement values Gjk (for an optical beam from emitter j to detector k) resulting from a reference touch at location $L_i$.

In a general case, dimensions of M are B×P where B is the number of beams and P is the number of reference touch regions (e.g., P=Q*N in the example of FIG. 10). In such embodiments, b is a column vector of size B of beam measurement values $b_n$. In some embodiments, transfer function M is obtained empirically from beam measurement values measured or observed for a reference touch provided at each of the reference touch locations. In alternative embodiments, transfer function M is determined by simulation and a mapping between beam measurement values $b_n$ and a reference touch at location $L_i$ is simulated by a kernel function that models a real finger interaction. Kernel functions such as radial base functions can be used.

Transfer function M defines how touch events (e.g., with binding values p) impacts beam measurement values b, according to:

$$b=Mp \quad (5)$$

Referring to FIG. 13, in any column i of matrix M, zero or substantially zero elements represent beam measurements corresponding to optical beams that are not disturbed by a reference touch at location $L_i$. Non-zero elements in any column i of matrix M reflect the beam measurement values (Gjk) corresponding to interactions between the reference touch at location $L_i$ and corresponding optical beams. For example, in the illustration of FIG. 13, non-zero elements of M (e.g., m22 and m52; shaded as dark grey) represent interactions between corresponding optical beams (with linear index n=2 and n=5) and a reference touch at location $L_2$. Conversely, zero-valued entries (e.g., shaded as light grey) represent optical beams with which a reference touch at location $L_2$ does not interact.

An inversion process for Eqn. (5) is determined 1510. In some embodiments, a pseudo-inverse matrix R of the transfer function M is computed based on optimization of one or more criteria, such as the Moore-Penrose criteria (least-square).

In FIG. 14, the second row (highlighted in gray) of pseudo-inverse matrix R is used to evaluate binding value estimate $p'_2$ for a reference touch at reference location $L_2$ using beam measurements b. Elements of the second row of R shaded in dark grey (r22 and r25) correspond to the dark grey shaded elements in M (m22 and m52; in FIG. 13). The remaining elements of the second row of R are shaded in light grey and correspond to elements that do not represent an interaction between a reference touch at location $L_2$ and corresponding optical beams based on transfer function M.

In some embodiments, in order to reduce computational load and memory requirements, a sparse matrix representation of matrix R is used. As shown in FIG. 14, a sparse representation of R can be formulated by setting to zero any elements (i, n) for which a touch event at location $L_i$ does not disturb an optical beam corresponding to a beam measurement value $b_n$. In alternative embodiments, other criteria to reduce computation include discarding or maintaining elements of the matrix M based on criteria such as beam direction, disturbance strength, expected energy, or any combination thereof.

In some embodiments, to further reduce computational load and memory requirements, non-zero elements of R are encoded to few bits per entry (e.g., using uniform or non-uniform quantization encoders). Encoded values for the non-zero elements may be used directly or they may be first processed by a quantization decoder. In another embodiment, the vector b of beam measurement values is encoded in a quantization step to a predefined number of bits per beam measurement.

Either encoded values are used directly in the reconstruction or they are first processed by a quantization decoder. In one embodiment, the quantization sets the digital resolution to one bit per element. In another embodiment, both the pseudo-inverse matrix R and beam vector b are quantized to one bit per element, in which case the inversion operation illustrated in FIG. 14 is equivalent to counting a number of active optical beams for a given touch region. Various alternative methods to determine an inversion process for transfer function M may be used. Alternatively, the inversion process may be evaluated iteratively using methods such as Kaczmarz.

In some embodiments, the number of reference touch regions P is less than the number of beam measurements B, resulting in an overdetermined system of equations. In an alternative embodiment, when a number of beam measurements B is less than a number of reference touch regions P, the system of equations is underdetermined. In such embodiments, inversion methods such as compressed sensing may be used.

IV. Improving Fidelity of Binding Value Estimates

In some embodiments, reducing noise and non-linearity (e.g., introduced by other drive electronics, light conversion, light propagation in the glass, light acquisition, receiver electronics, receiver ADC, and so on) of optical beam measurements would improve fidelity of the binding value estimates. Improving the fidelity of a given beam transmission coefficient optionally comes at the expense of fidelity for other beams. For example highly directional emitters increase light directed toward detectors directly facing them at the expense of light transmitted to off-axis detectors.

Since binding value estimates are obtained by combining potentially noisy $b_n$ values from various beam measurements, in some embodiments noise and non-linearity is equally distributed among optical beams in order to reduce or minimize a global measurement error in binding value estimates. In some embodiments, this is achieved by distributing light propagating in the glass as evenly as possible, for example by extending the emitter or receiver angular span, steering the emitters and receivers toward a predetermined direction based on an optimization criterion (e.g., to steer the optical axes towards a center, toward a closest corner), and so on. These approaches divert light away from a region where beams abound, resulting in a more balanced light distribution within the glass.

In alternative embodiments, positions of emitters and detectors are optimized to improve measurement fidelity. In some embodiments, positions of emitters and detectors are dithered such that a localized density of beams remains substantially constant across the surface. Dithering is obtained by varying the distance from one opto-element (emitter or detector) to the next when compared to constant distance of a regular-pitch alignment. A regular position grid has no distance variations from one opto-element to the next (within a given array or side) and the constant distance then equates to the grid pitch. The dithering pattern is optimized to avoid beam concentration in any particular region. In one embodiment, the dithering pattern is obtained by adding to the regular positions a zero-mean pseudo-random variation pattern consisting of positive and negative position variations (the variation is typically applied in one dimension, namely along the array or touch zone side direction). The magnitude of variations is typically less than the pitch of the regular grid that the variations are added to. In one embodiment, the pseudo-random pattern is constructed such that two consecutive values only slowly change (pattern has a low-pass spectrum). Other variation patterns can be used, such as sine or cosine wave patterns (e.g., increasing or decreasing the emitter-detector density near the corners). In some embodiments, positions of emitters and detectors are determined through a search process that optimizes a metric such as beam density uniformity, subject to constraints on parameters such as emitter-detector spacing or overall dimensions of the touch zone. The search process may test multiple sets of emitter-detector positions and select a subset of positions providing the best optimization metric.

V. Applications

The touch-sensitive devices described above can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler cell phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

VI. Additional Considerations

The figures depict embodiments of the present invention for purposes of illustration only. One skilled in the art will readily recognize from the following discussion that alternative embodiments of the structures and methods illustrated herein may be employed without departing from the principles of the invention described herein.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein.

What is claimed is:

1. A method of resolving a multi-touch event occurring at a plurality of touch regions on a touch sensitive surface, the method comprising a computer processor executing the steps of:
    receiving a plurality of beam measurement values $b_n$ resulting from the multi-touch event, wherein different beam measurement values $b_n$ result from different optical beams transmitted across the touch sensitive surface and the multi-touch event disturbs optical beams in a vicinity of the touch region;
    determining binding value estimates $p'_i$ from the beam measurement values $b_n$, the binding value estimates $p'_i$ estimating optical beam disturbance at corresponding locations $L_i$ of the touch-sensitive surface, wherein determining the binding value estimates $p'_i$ is based on modeling a transfer function from binding values $p_i$ to the beam measurement values $b_n$ as a linear transfer function; and
    determining the touch regions for the multi-touch event from the binding value estimates $p'_i$.

2. The method of claim 1, wherein the linear transfer function is described by:

$$b=Mp,$$

where:
    b is a column vector of the beam measurement values $b_n$,
    p is a column vector of the binding values $p_i$, and
    M is the linear transfer function, and each column n of the matrix M is the beam measurement values $b_n$ resulting from a reference touch at location $L_i$, said reference touch corresponding to a binding value $p_i=1$.

3. The method of claim 2, wherein determining binding value estimates $p'_i$ comprises applying an inversion process to b=Mp.

4. The method of claim 2, wherein determining binding value estimates $p'_i$ comprises evaluating $$p'=Rb,$$

where:
    p' is a column vector of the binding value estimates $p'_i$, and
    R is an inverse matrix of the linear transfer function M.

5. The method of claim 4, wherein R is a sparse matrix.

6. The method of claim 4, wherein R is zero for elements for which a touch at location $L_i$ does not disturb an optical beam for the beam measurement value $b_n$.

7. The method of claim 2, wherein b=Mp is overdetermined.

8. The method of claim 2, wherein the number of beam measurement values $b_n$ is greater than the number of locations $L_i$.

9. The method of claim 2, wherein each column n of the matrix M is at least 50% zeroes.

10. The method of claim 2, wherein the reference touch occupies a finite area of less than 100 square millimeters and each column n of the matrix M contains zeroes for elements outside the finite area.

11. The method of claim 10, wherein the reference touch occupies a constant area.

12. The method of claim 10, wherein the reference touch occupies a variable area.

13. The method of claim 2, wherein reference touches at adjacent locations $L_i$ overlap.

14. The method of claim 2, wherein reference touches occupy at least 1000 locations $L_i$.

15. The method of claim 2, wherein reference touches at adjacent locations $L_i$ do not overlap.

16. The method of claim 2, wherein each column n of the matrix M contains elements less than zero.

17. The method of claim 1, further comprising:
receiving optical measurements of optical beams from emitters to detectors, wherein an optical measurement is a non-linear function of touch events along the optical beam; and
calculating the beam measurement values $b_n$ from the optical measurements by applying a non-linear function.

18. The method of claim 17, wherein the non-linear function is a log function.

19. The method of claim 17, wherein the non-linear function is a log function of an optical transmittance of optical beams from emitters to detectors.

20. The method of claim 17, wherein the non-linear function is a linearized approximation of a log function of an optical transmittance of optical beams from emitters to detectors, the linearized approximation representing an optical loss coefficient of the optical beams.

21. The method of claim 1, wherein the locations $L_i$ are located on a rectangular grid.

22. The method of claim 1, wherein the locations $L_i$ are located on a regular grid.

23. The method of claim 1, wherein the locations $L_i$ are irregularly spaced.

24. The method of claim 1, wherein the locations $L_i$ are at least 2 mm apart from each other.

25. The method of claim 1, wherein determining the touch regions for the multi-touch event comprises applying a threshold to the binding value estimates $p'_i$, and identifying candidate touch regions based on which binding value estimates $p'_i$ exceed the threshold.

26. The method of claim 1, wherein determining the touch regions for the multi-touch event comprises applying a threshold to a local feature based on the binding value estimates $p'_i$, and identifying candidate touch regions based on which local features exceed the threshold.

27. The method of claim 1, wherein determining the touch regions for the multi-touch event comprises using more than one binding value estimate $p'_i$ to determine each touch region.

28. The method of claim 27, wherein determining the touch regions for the multi-touch event comprises interpolating between binding value estimates $p'_i$ to determine each touch region.

29. The method of claim 1, wherein the touch regions can be determined to an accuracy that is smaller than the spacing between adjacent locations $L_i$.

30. The method of claim 1, wherein the linear transfer function is determined a priori.

31. The method of claim 1, further comprising:
automatically calibrating to compensate for changes in the linear transfer function.

32. The method of claim 1, wherein the optical beams are transmitted between emitters and detectors arranged around a periphery of the touch sensitive surface.

33. The method of claim 1, wherein multiple optical beams are simultaneously received by detectors.

34. The method of claim 1, further comprising determining physical attributes for touch events in the multi-touch event from the binding value estimates $p'_i$.

35. The method of claim 34, wherein determining physical attributes for a touch event comprises determining one or more of: a touch pressure, a pressure gradient, a spatial pressure distribution, and an optical transmission property associated with the touch event.

36. The method of claim 34, further comprising identifying one or more objects causing the multi-touch event based on the determined physical attributes for the touch events of the multi-touch event.

37. The method of claim 1, further comprising determining spatial properties for the touch regions of the multi-touch event from the binding value estimates $p'_i$.

38. The method of claim 37, wherein determining spatial properties for the touch regions comprises determining one or more of: a dimension, a boundary, a perimeter, an area, and a geometric shape, associated with the touch regions.

39. The method of claim 37, further comprising identifying one or more objects causing the multi-touch event based on the determined spatial properties for the touch regions of the multi-touch event.

* * * * *